United States Patent
Lin

(10) Patent No.: US 9,815,344 B2
(45) Date of Patent: Nov. 14, 2017

(54) TIRE SENSING SYSTEM OF KINETIC PARAMETERS

(71) Applicant: JONATHAN LIVINGSTON ENGINEERING CO., LTD., Taipei (TW)

(72) Inventor: Yi-Chuan Lin, Taipei (TW)

(*) Notice: Subject to any disclaimer, the term of this patent is extended or adjusted under 35 U.S.C. 154(b) by 0 days.

(21) Appl. No.: 15/291,610

(22) Filed: Oct. 12, 2016

(65) Prior Publication Data

US 2017/0106707 A1    Apr. 20, 2017

(30) Foreign Application Priority Data

Oct. 15, 2015 (TW) .............................. 104133805 A

(51) Int. Cl.
| | |
|---|---|
| *G08C 19/22* | (2006.01) |
| *B60C 25/00* | (2006.01) |
| *B60C 25/05* | (2006.01) |
| *G01M 17/02* | (2006.01) |

(52) U.S. Cl.
CPC ........ *B60C 25/005* (2013.01); *B60C 25/0554* (2013.01); *G01M 17/025* (2013.01)

(58) Field of Classification Search
CPC .............................. B60B 25/005; G08C 19/22
USPC ........ 73/146.5, 143.3, 146; 340/870.7, 443; 382/133
See application file for complete search history.

(56) References Cited

U.S. PATENT DOCUMENTS

| | | | |
|---|---|---|---|
| 3,916,176 A | 10/1975 | Alien et al. | |
| 4,180,794 A | 12/1979 | Claxton | |
| 6,612,164 B1 | 9/2003 | Meins | |
| 6,967,590 B2 | 11/2005 | Mancosu et al. | |
| 7,546,764 B2* | 6/2009 | Morinaga | B60C 19/00 73/146 |
| 7,739,906 B2* | 6/2010 | Hatanaka | G01D 11/245 73/146 |
| 8,115,614 B2* | 2/2012 | Oda | B60C 23/0408 340/442 |

* cited by examiner

*Primary Examiner* — Jewel V Thompson

(57) ABSTRACT

A tire sensing system of kinetic parameters is provided, including: at least one wave-emitting source configured to rotate with a tire, and emit at least one detection wave towards an internal surface of said tire; at least one wave sensor configured to rotate with said at least one wave-emitting source, and output a measurement signal according to a physical parameter of said at least one detection wave being reflected off said internal surface; and a processing unit configured to receive said measurement signal, record at least two instants in time during which said at least one detection wave sweeps across the footprint of said tire, and compute a kinetic parameter of said tire with said at least two instants.

11 Claims, 12 Drawing Sheets

TIRE SENSING SYSTEM OF KINETIC PARAMETERS

BACKGROUND OF THE INVENTION

Field of the Invention

The present invention is related to a sensing system of kinetic parameters for pneumatic tires, and is particularly related to those depend their operation on both tire rolling and deflection without actual contact.

Description of the Prior Art

U.S. has issued more than 60 tire deflection or tire footprint related patents since 1979, only a few of them are similar to the present invention. For examples, U.S. Pat. No. 4,180,794 determines the degree of tire deflection by the quantity of a light reflecting off its internal surface, and U.S. Pat. No. 6,612,164 detects both the longitudinal and transverse changes in the position of a measuring point on tire internal surface, by the reflected radiation of the measuring point.

Another U.S. Pat. No. 6,967,590 measures tire deformation with the optical image of a reflective element disposed on its internal surface, still another Germany patent No. 3916176 measures the distance between wheel rim and tire internal surface by triangulation. All above patents make use of light reflection of tire internal surface, none of them takes account of the lateral tilt, which is a significant part of the whole picture.

Accurate, complete yet simple acquisitions of tire kinetic parameters are certainly the ultimate goal of all related art, but there seems to exist an air of mystery that has not been fully unveiled, the present invention is therefore such an attempt trying to fulfill the necessity.

SUMMARY OF THE INVENTION

An object of the present invention is to provide a sensing system of kinetic parameters for pneumatic tires. When projecting a detection wave perpendicularly on a point of tire internal surface, rapid and significant changes in the angle of both incidence and deflection, occur every time the point travels across the tire footprint due to tire deflection. By analyzing a signal in inverse proportional to the sum of the two angles, characterization of the tire footprint is achieved with two specific instants and the cyclic period of tire rolling. Based on three specific instants, a longitudinal kinetic parameter being one of frictional force, displacement, and deformation is also revealed.

To achieve the above and other objects, a tire sensing system of kinetic parameters is provided, including: at least one wave-emitting source configured to rotate with a tire, and emit at least one detection wave towards an internal surface of said tire; at least one wave sensor configured to rotate with said at least one wave-emitting source, and output a measurement signal according to a physical parameter of said at least one detection wave being reflected off said internal surface; and a processing unit configured to receive said measurement signal, record at least two instants in time during which said at least one detection wave sweeps across said footprint of said tire, and compute a kinetic parameter of said tire with said at least two instants.

The followings explain the present invention in detail, the preferred embodiment is explanatory of the invention and the drawings are illustrative only.

DETAILED DESCRIPTION OF THE PREFERRED EMBODIMENTS

Figure 1:
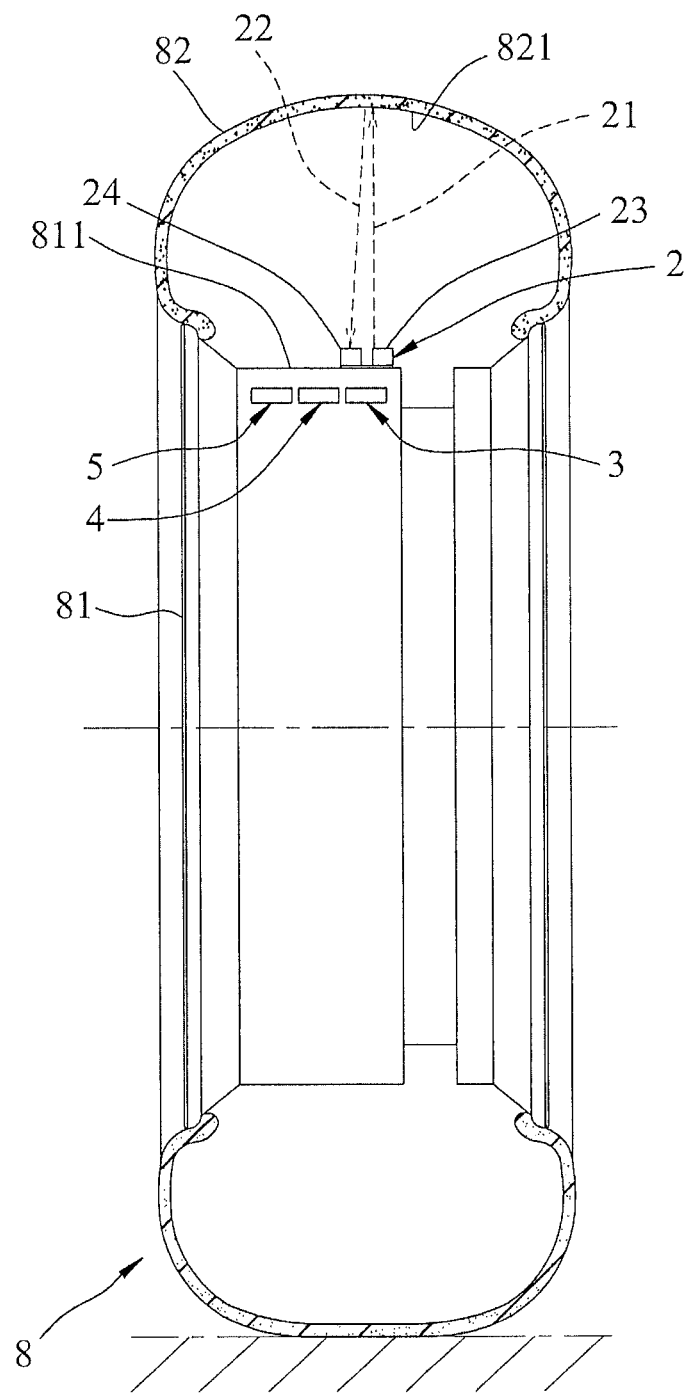
FIG. 1 is a preferred embodiment of the present invention.

The present invention is a tire sensing system of kinetic parameters, comprises at least one wave-emitting source, at least one wave sensor and a processing unit. Said tire has two meanings in this specification, it can be either a pneumatic tire itself, or an assembled pneumatic wheel that is comprised of both a pneumatic tire and a wheel rim.

Said at least one wave-emitting source is configured to rotate with said tire, and emit at least one detection wave (directional) towards an internal surface of said tire. Said at least one wave sensor is configured to rotate with said at least one wave-emitting source, and output a measurement signal according to a physical parameter of said at least one detection wave being reflected off said internal surface. Said processing unit is configured to receive said measurement signal, record at least two instants in time during which said at least one detection wave sweeps across said footprint of said tire, and compute a kinetic parameter of said tire with said at least two instants. Said kinetic parameter includes a cyclic period of tire rolling. Moreover, said at least two instants in conjunction with said cyclic period of tire rolling leads to five additional kinetic parameters of said tire, which are deflection, born load, footprint area, angular speed and lateral tilt.

FIGS. 1 through 7 represent a preferred embodiment of the present invention. A pneumatic wheel 8 has a wheel rim 81 and a pneumatic tire 82 being assembled on said wheel rim 81 is in contact with the ground. Said wheel rim 81 has an outer rim surface 811, said pneumatic tire 82 has an internal surface 821. Said preferred embodiment comprises a light emitter/receiver module 2, a control processor 3, a power unit 4, a transceiver 5, a pressure sensor 6 and a temperature sensor 7.

In said preferred embodiment, said at least one wave-emitting source and said at least one wave sensor are represented by said light emitter/receiver module 2, said processing unit is represented by said control processor 3. Said at least one wave-emitting source may emit either electromagnetic or sound wave of all frequency, said processing unit can be either internal to or outside of the air chamber of said pneumatic wheel 8, and is functionally coupled to said at least one wave sensor by wires or wirelessly.

Said light emitter/receiver module 2 is coupled to said wheel rim 81, emits a light beam 21 towards said pneumatic tire 82 and receives a reflected light 22 returning in the opposite direction from said internal surface 821, also outputs a light sensing signal according to said reflected light 22. In said preferred embodiment, said at least one detection wave is represented by said light beam 21, said measurement signal is represented by said light sensing signal. The latter is perceived for now but is not limited to as being corresponding to the light quantity of said reflected light 22, in other embodiments it is free to stand for any energy/intensity/volume related parameter of EM or sound wave.

Said light emitter/receiver module 2 comprises a light emitter 23 for emitting said light beam 21, and a light receiver 24 for producing said light sensing signal on the receiving of said reflected light 22. In said preferred embodiment, said at least one wave-emitting source is represented by said light emitter 23, said at least one wave sensor is represented by said light receiver 24.

Figure 2:
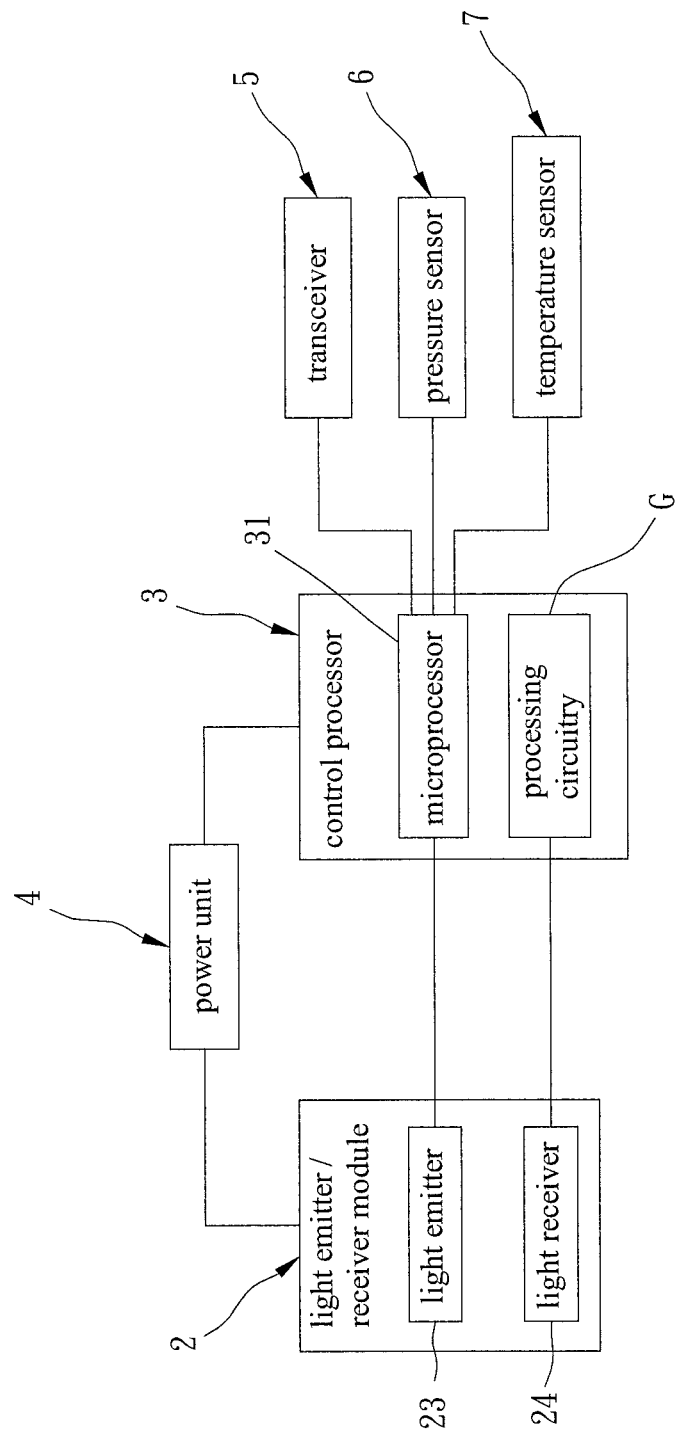
FIG. 2 is the block diagram of said preferred embodiment.
Figure 5:
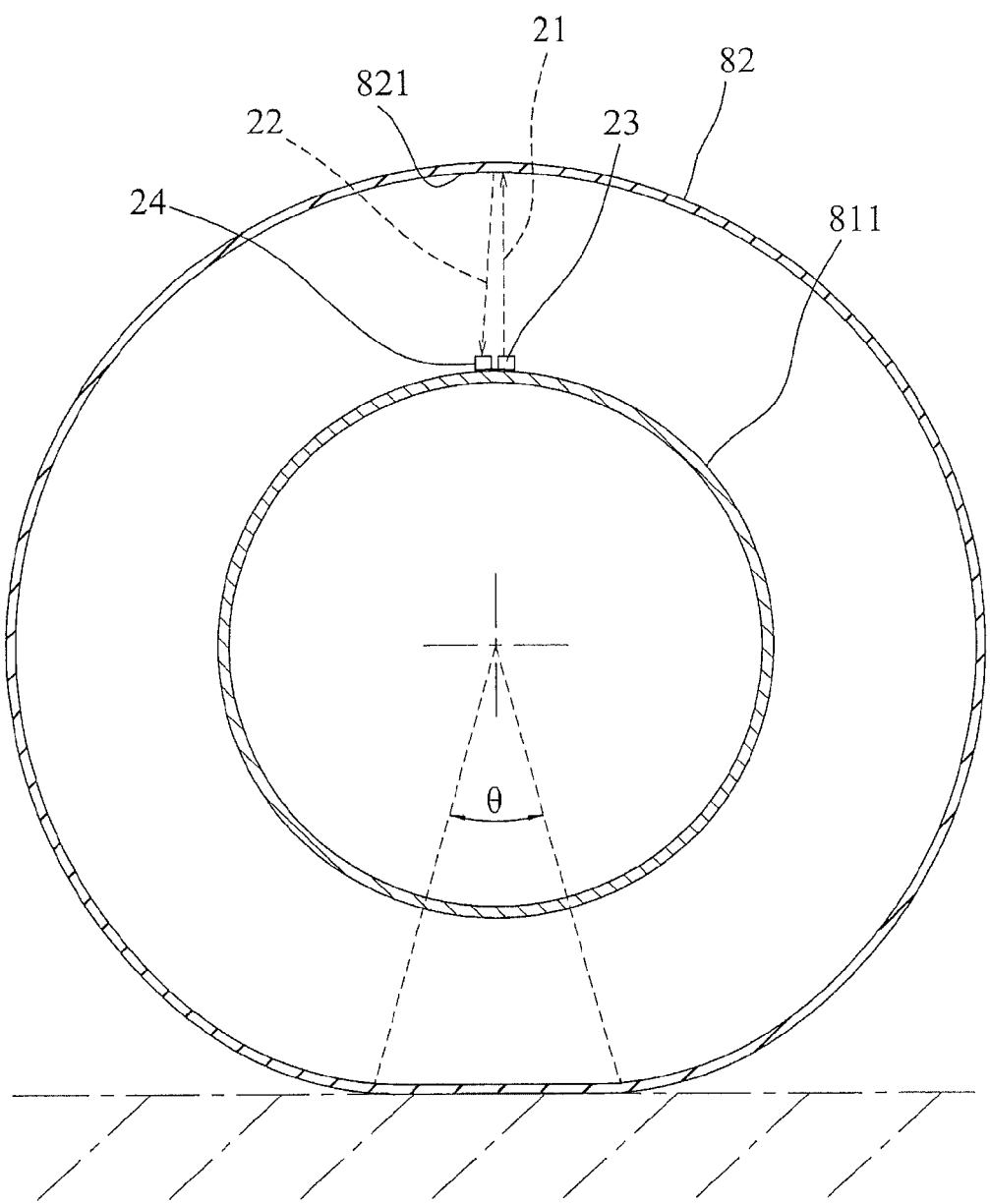
FIG. 5 is the sectional view of said preferred embodiment operating in the un-deformed region.

Refer to FIGS. 1, 2, and 5, said control processor 3 is coupled to said wheel rim 81 and is electrically connected to both said light emitter 23 and said light receiver 24, and computes the central angle of tire footprint Θ basing on said light sensing signal. The central angle of tire footprint represents the central angle of the flat part of tire tread that is in contact with the ground, tire footprint ranges from the tire tread having the least to the most and to the least deflection.

Figure 3:
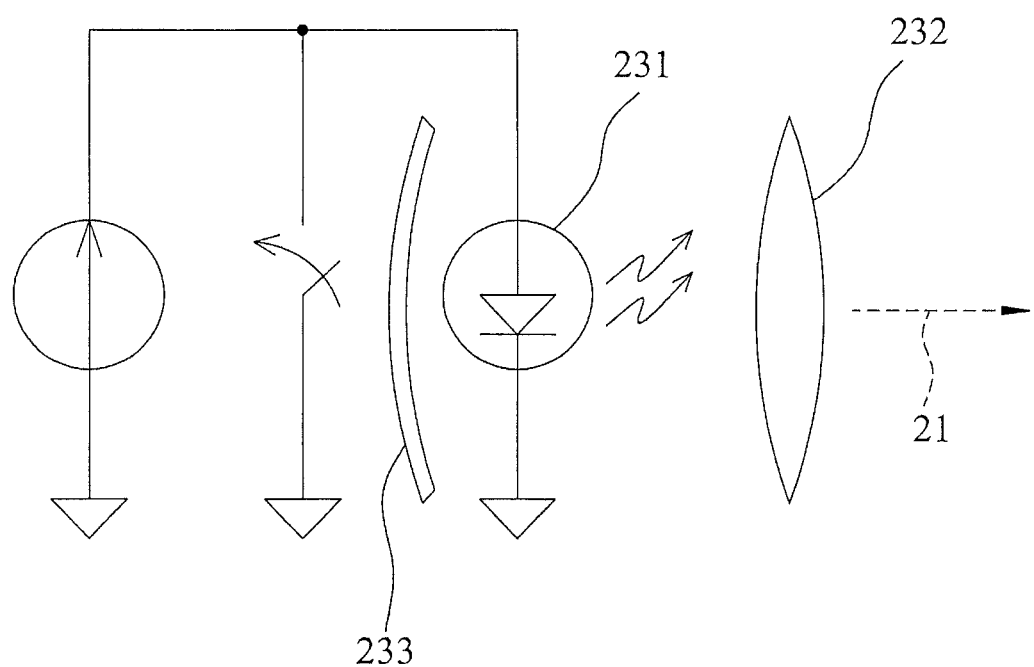
FIG. 3 is a typical example of the light emitter of said preferred embodiment.
Figure 4:
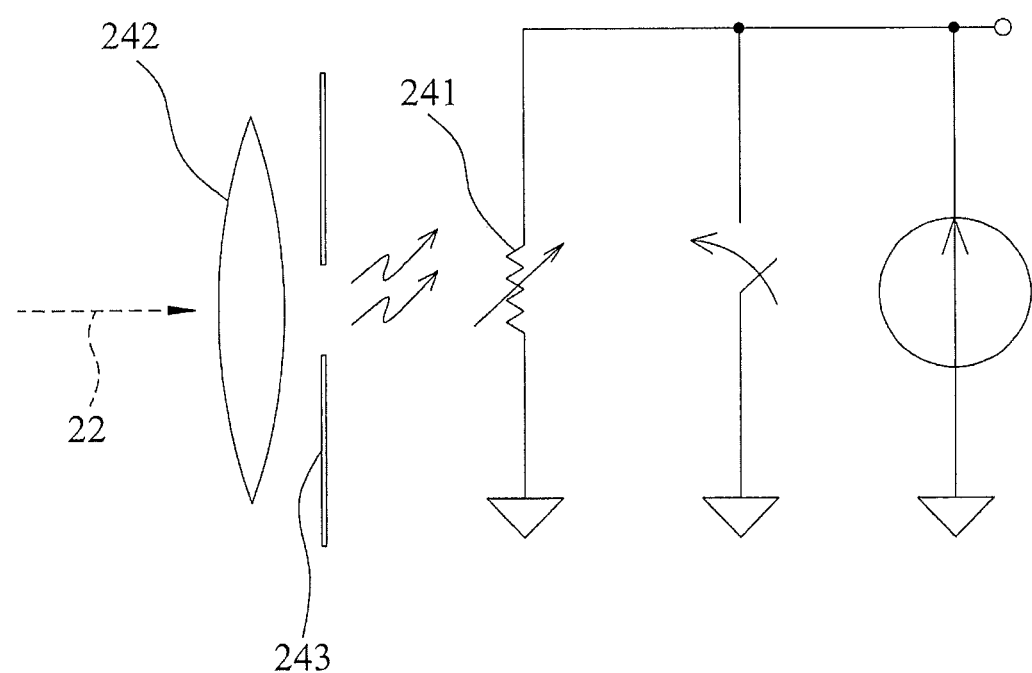
FIG. 4 is a typical example of the light receiver of said preferred embodiment.

Refer to FIGS. 1, 3, and 4, said light emitter 23 has an emitting member 231 for emitting said light beam 21, a lens 232, and a reflective plate 233. In said preferred embodiment, said lens 232 is located between said emitting member 231 and said pneumatic tire 82, said reflective plate 233 is located between said emitting member 231 and said wheel rim 81.

Said light receiver 24 has an optical-electrical conversion circuit 241 for receiving said reflected light 22 and outputting said light sensing signal, a lens 242, and an optical grating 243. In said preferred embodiment, said lens 242 and said optical grating 243 are located between said optical-electrical conversion circuit 241 and said pneumatic tire 82.

Said control processor 3 comprises a microprocessor 31 that is electrically connected with said light emitter 23, and a processing circuitry 32, which is electrically connected with both said microprocessor 31 and said light receiver 24.

Said power unit 4 is electrically connected to said light emitter/receiver module 2 and said control processor 3.

Said transceiver 5 is electrically connected to said control processor 3. In said preferred embodiment, said transceiver 5 sends and receives messages wirelessly.

Said pressure sensor 6 measures an air pressure of said pneumatic tire 82.

Said temperature sensor 7 measures an air temperature of said pneumatic tire 82.

Refer to FIGS. 2, 3, and 5, to start said preferred embodiment, drive said pneumatic wheel 8 to roll forward. Said control processor 3 activates said light emitter 23 to project said light beam 21 onto said internal surface 821, said light beam 21 is focused by a lens 232 to narrow down its cross sectional area.

Figure 6:
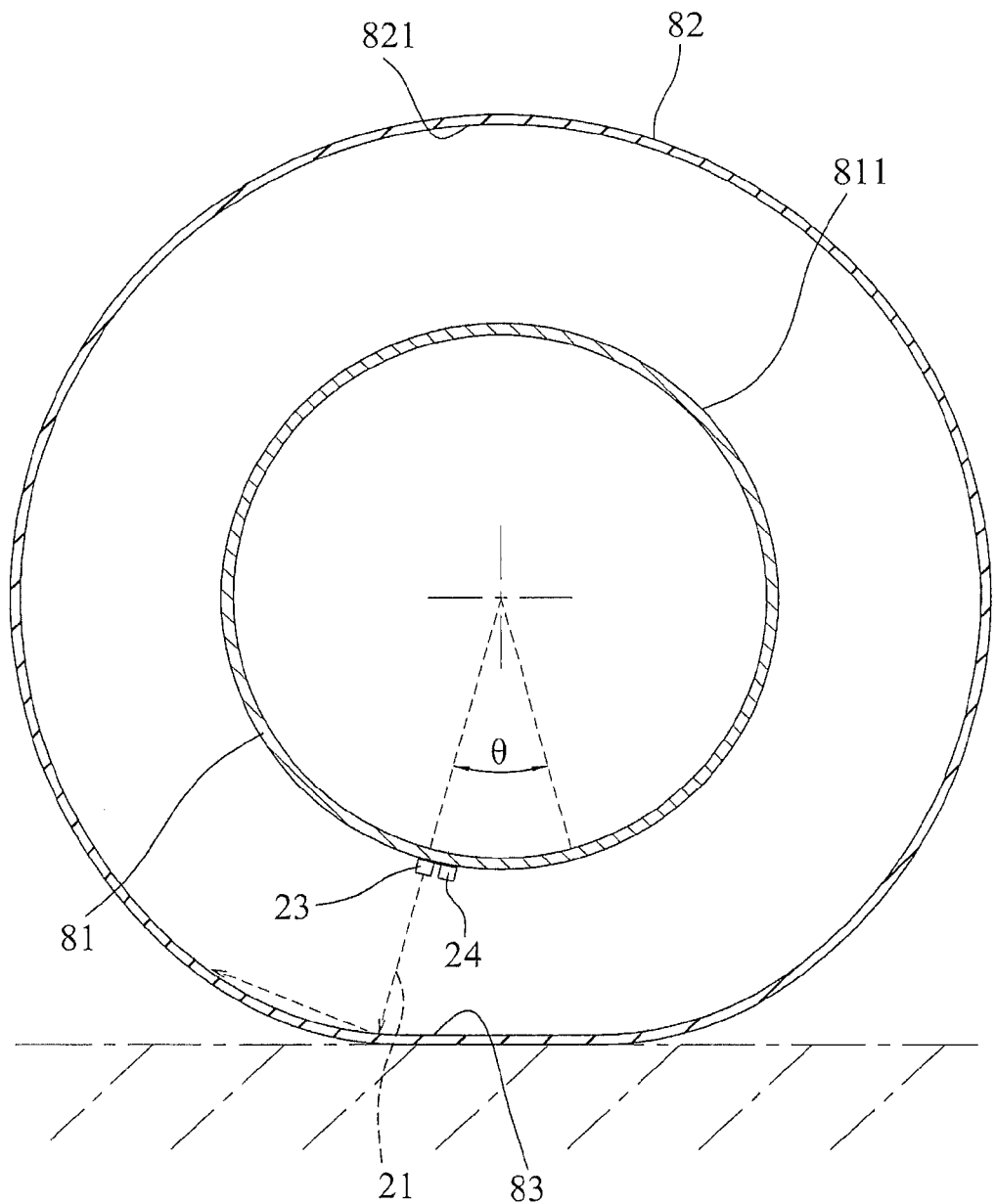
FIG. 6 is the sectional view of said preferred embodiment operating at one edge of the deformed region.
Figure 7:
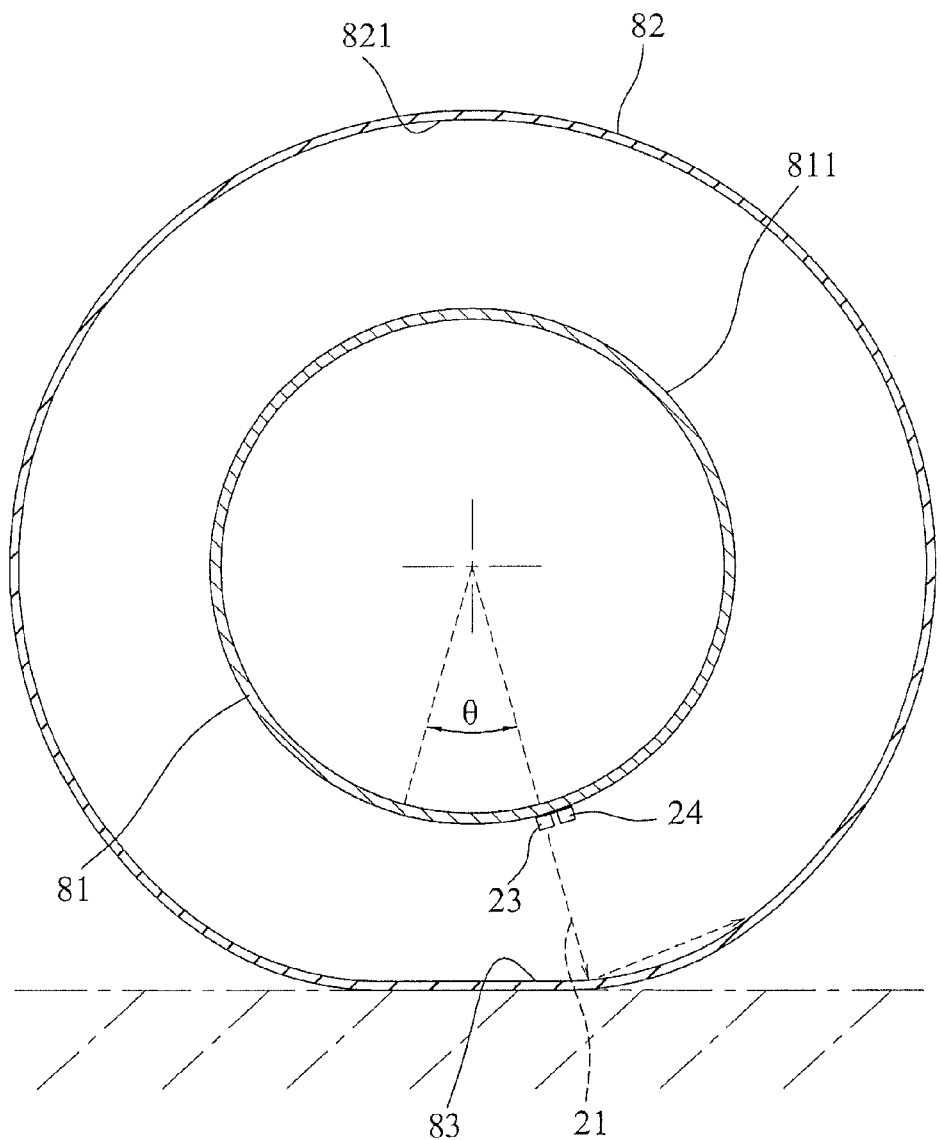
FIG. 7 is the sectional view of said preferred embodiment operating at the other edge of the deformed region.

Refer to FIGS. 5, 6, and 7, when said light beam 21 is projected on the un-deformed region of said pneumatic tire 82, light quantity of said reflected light 22 being received by said light receiver 24 would be at its full maximum; while said light beam 21 is projected on the deformed region sweeping from the leading edge to the tailing edge, said light receiver 24 would experience an increase followed by an equal decrease on received light quantity in the interval.

Refer to FIGS. 2 and 4, said optical-electrical conversion circuit 241 receives said reflected light 22 to produce said light sensing signal for sending to said processing circuitry 32, where pre-processing, further conversion, and analytical computation of said light sensing signal may be carried out.

Therefore, as said light beam 21 sweeps across the leading edge of tire footprint, said light sensing signal would undergo a rapid fall; as said light beam 21 sweeps across the tailing edge of tire footprint, said light sensing signal would undergo a rapid rise.

Consequently, the respective timings said light beam 21 sweeps across the footprint edges can be identified and recorded by said processing circuitry 32 and said microprocessor 31.

Refer to FIGS. 2, 6, and 7, said light sensing signal changes dramatically in the shorter interval of deformed region and remains relatively calm in the much longer interval of un-deformed region, so after one tire revolution, said microprocessor 31 distinguishes time interval of the deformed region from that of the un-deformed region, thus the cyclic period of tire rolling and the central angle of tire footprint are determined accordingly.

If a look-up table previously established by laboratory test results is available, techniques such as compensation, interpolation, calibration and the like would be helpful for accuracy enhancement. Said control processor 3 can further transmit the central angle of tire footprint together with tire pressure/temperature to a vehicle computer (not shown) and/or to be presented to the driver.

Drivers don't stand a chance to react without such a critical information, for the conjunction of normal tire pressure and larger central angle of tire footprint implies the tire is overloaded, both tire wear and power loss soar in such a situation. On the other hand, normal tire pressure in conjunction with smaller central angle of tire footprint is showing a critical sign of insufficient braking power, a reduction in tire pressure is recommended especially for rainy days.

Further, tire footprint area is well estimated by the central angle of tire footprint and tire radius/width, tire load would in turn be well estimated by multiplying the footprint area with tire pressure.

Figure 8:
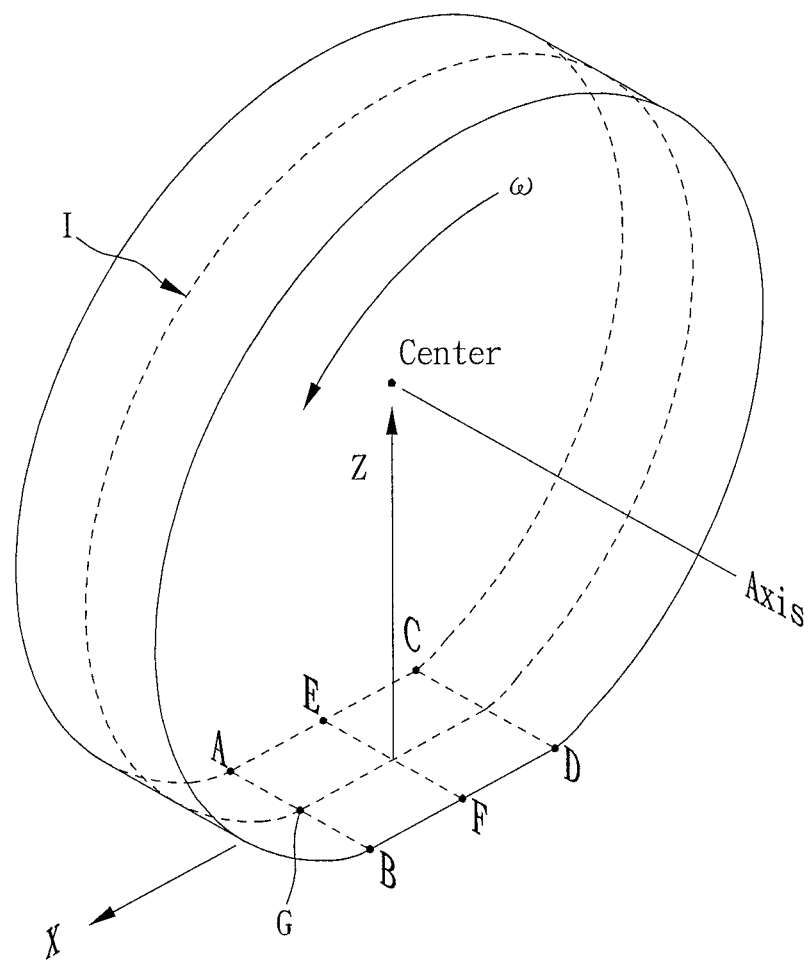
FIGS. 8 and 9 are sectional views of a tire footprint.
Figure 9:
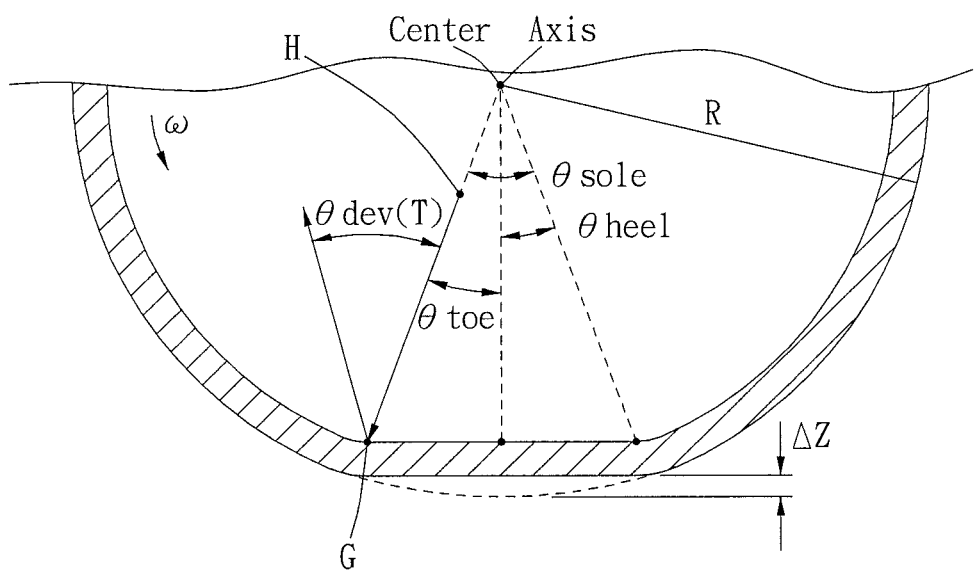

Refer to FIGS. 6 to 11, more details of the present invention are explained it the followings. Assume a loaded tire is rolling forward on a ground plane, its rotation axis is parallel to the plane. Refer to FIGS. 8 and 9 for the following definitions of said loaded tire:

Footprint is the rectangular plane ABCD having an area of Abcd;
Leading footprint edge is line AB;
Tailing footprint edge is line CD;
Rotation axis is Axis;
Perpendicularly projected line of Axis on plane ABCD is line EF;
Longitudinal direction is X;
Normal direction of plane ABCD is Z, tire deflection is ΔZ;
Central circumference of tire internal surface is I;
Tire geometric center is Center;
Width W is the length of line AB, CD, or EF;
Tire radius is R;
G is the point of reflection on I;
H is a reference point of the wheel rim on line Center to G;
The Nth-cycle angular speed is ω(N);
The Nth-cycle cyclic period of rolling is Period(N);
The Nth time arrow HG intersects line AB occurs at time Ttoe(N);
The Nth time arrow HG intersects line EF occurs at time Tsole(N);
The Nth time arrow HG intersects line CD occurs at time Theel(N);

The Nth-cycle central angle formed by line AB and CD is Θsole(N);

The Nth-cycle central angle formed by line AB and EF is Θtoe(N);

The Nth-cycle central angle formed by line CD and EF is Θheel(N);

The angle between arrow GH and the direction of strongest wave reflection at G is Θdev(T).

Set up at least one wave-emitting source and at least one wave sensor at H, said at least one wave-emitting source and said at least one wave sensor are in close proximity to each other. Said at least one wave-emitting source emits at least one detection wave of small cross sectional area towards G, said at least one wave sensor receives the return wave of said at least one detection wave being reflected off G, and outputs a measurement signal according to an energy/intensity/volume related parameter of said return wave.

Figure 10:
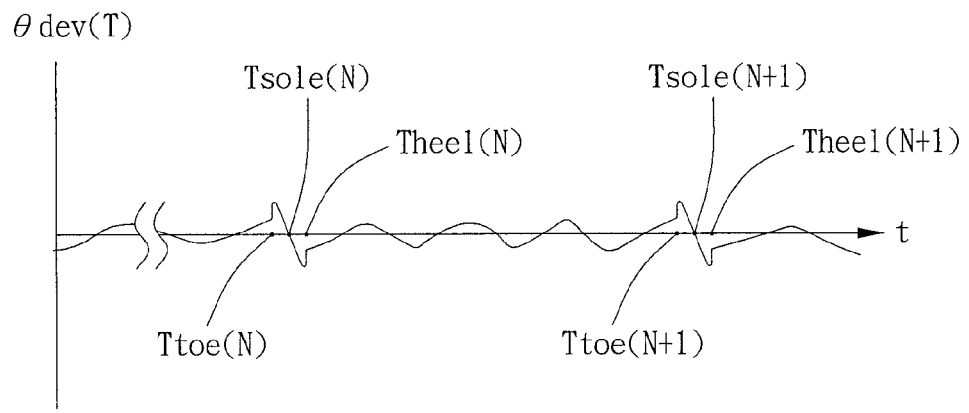
FIGS. 10 and 11 are typical measurement graphs of said preferred embodiment.

G can be either a point of tire internal surface, or a reflective element 83 that adheres to said internal surface. It is preferred for said internal surface or said reflective element 83 to possess consistent and smooth surface, so that the strongest or the most possible direction in which said at least one detection wave deflects at G, remains unchanged if G were a perfect reflective coating. Assume said internal surface is symmetrical about I, a typical example of Θdev(T) is illustrated in FIG. 10 given ω(N) is constant.

Since the sign of Θdev(T) does not matter to any energy/intensity/volume related parameter of said return wave, therefore the absolute value of Θdev(T) results in both a local extreme and a local time-rate extreme of change, not only at both Ttoe(N) and Theel(N) but also at Tsole(N).

Figure 11:
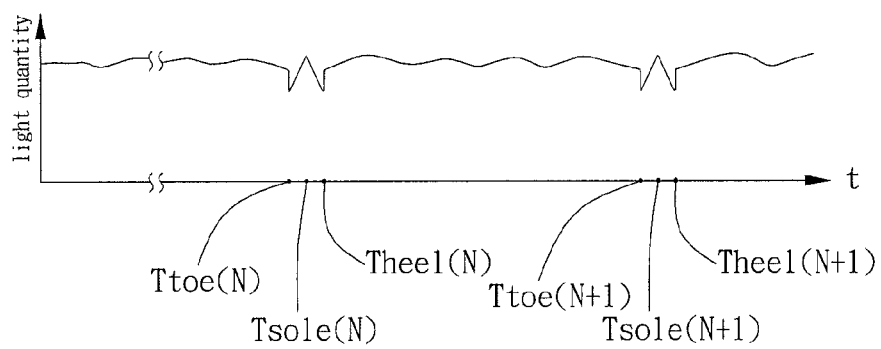

Said measurement signal can be optimized by adjusting cross sectional area of said at least one detection wave according to both surface smoothness of G and the distance from H to G, and/or selecting physics and frequency of said at least one detection wave according to the material and reflectivity of G. A typical example of said measurement signal is illustrated in FIG. 11, in which an infrared laser beam was projected on the internal surface of a 185/65R14 tire itself, and the measurement signal was corresponding to the light quantity of said return wave received at H by an infrared light sensor.

Further, set up a processing unit. Said processing unit receives said measurement signal, has hardware and software combined capability of computation, is capable of tagging an event to its own time base and storing/recording relevant data in its memory, is also capable of identifying at least one of a local extreme and a local time-rate extreme of change associated with said measurement signal. Whenever an extra accelerometer is available, whether electrically coupled to or embedded in said processing unit, either or both of ω(N) and Period(N) can be derived from said accelerometer with said computation.

For instance, said processing unit might have recorded two instants Ttoe(N) and Theel(N) in one case, and have already derived Period(N) with said accelerometer in existence, the central angle of tire footprint Θ (which equals Θsole(N) at here) is defined by the two instants and Period(N) in this case: Θsole(N)=360°·(Theel(N)−Ttoe(N))/Period(N). Suppose in another case three instants Ttoe(N), Theel(N) and Ttoe(N+1) were recorded, obviously Period(N) is self-contained in the three instants:

$$\Theta\mathrm{sole}(N)=360°·(T\mathrm{heel}(N)-T\mathrm{toe}(N))/(T\mathrm{toe}(N+1)-T\mathrm{toe}(N)).$$

Suppose in still another case said processing unit recorded Ttoe(N), Tsole(N), Theel(N), Ttoe(N+1), Tsole(N+1) and Theel(N+1) sequentially, then Period(N) is averaged by:

$$\mathrm{Period}(N)=((T\mathrm{heel}(N+1)-T\mathrm{heel}(N))·(T\mathrm{toe}(N+1)·T\mathrm{toe}(N)))^{0.5},$$ the same principle applies to Θsole(N):

$$\Theta\mathrm{sole}(N)=360°·((T\mathrm{heel}(N+1)-T\mathrm{toe}(N+1))·(T\mathrm{heel}(N)-T\mathrm{toe}(N)))^{0.5}/\mathrm{Period}(N).$$

Similarly, Θtoe(N) and Θheel(N) are all concluded in this way.

Even the tire is not rolling at a constant speed, since a typical family saloon advances at most 2.5 meters on one wheel-revolution, once a certain speed is reached so that ω(N) and ω(N+1) can be regarded to have the same acceleration, then the above 2 equations could actually be a very good guess. A numerical evaluation of a race car is demonstrated herein, assume the angular travel in one of the wheels is: Θtravel(T)=1389·T²+1000·T, and further assume Θsole(N)=20° and Ttoe(1)=0 Sec. First solve T for Θtravel(T)=20°, 360°, 380°, 720°, 740°, 1080°, and 1100°, next by substituting these answers into the last two equations, the estimated results are: Period(1)=0.2595 Sec, Θsole(1)=20.8°; Period(2)=0.1802 Sec, Θsole(2)=20.2°; Period(3)=0.1468 Sec, and Θsole(3)=20.0°.

Therefore, Abcd=2·W·R·Sin(Θsole(N)/2), ΔZ=R·(1−Cos(Θsole(N)/2)), ω(N)=360°/Period(N).

It takes the tire's carcass spring constant Kcarcass(ΔZ) other than tire pressure P alone to compute tire load L more precisely: L≈P·Abcd+ΔZ·Kcarcass(ΔZ). The latter can be input to said processing unit by wire or wirelessly after scanning the barcode of a specific tire, or by using an established data bank stored in the memory of said processing unit once a specific tire's RFID is recognized.

Similarly, longitudinal frictional force F(N) is derived by modeling a tire deformation in one direction as a displacement in that direction of an equivalent spring: F(N)=(Θheel(N)/Θtoe(N)−1)·K(P,L,Θheel(N)/Θtoe(N)), thus Θheel(N)/Θtoe(N) can be regarded as the longitudinal displacement or deformation related factor in the equivalent spring model.

During braking the ground exerts a great force on the tire so that ω(N) can change instantly, at this moment said processing unit has to record consecutive sets of Ttoe(N), Tsole(N), and Theel(N), and compute on a cycle-by-cycle basis for the highest possible update rate according to the following:

$$\Theta\mathrm{heel}(N)/\Theta\mathrm{toe}(N)=(T\mathrm{heel}(N)-T\mathrm{sole}(N))/(T\mathrm{sole}(N)-T\mathrm{toe}(N)).$$

Said accelerometer has many more benefits in the present invention, it enables said processing unit to wake up to a braking deceleration for power saving while keeping alert, the accompanied self-check and calibration capabilities are also essential to make a system more complete.

Though it is preferred for said processing unit to acquire complete sets of Ttoe(N), Tsole(N), and Theel(N) more than one tire revolution, sometimes due maybe to poor road conditions, for instance, it is possible only Tsole(N), Ttoe(N+1) and Ttoe (N+2) were recorded in several consecutive revolutions. Even so, still the following estimations work well in general:

$$\mathrm{Period}(N+1)=T\mathrm{toe}(N+2)-T\mathrm{toe}(N+1),$$

$$\Theta\mathrm{sole}(N+1)=720°·(\mathrm{Period}(N+1)+T\mathrm{sole}(N)-T\mathrm{toe}(N+1))/\mathrm{Period}(N+1).$$

To operate in diverse road conditions, said processing unit should be built in a number of strategies, as whether to acquire more data sets for averaging new results with the old, to keep on the recording/computing/screening process until tire speed stabilizes, to listen and response to the control from the vehicle, or simply to enter a sleep mode temporarily, etc.

Figure 12:
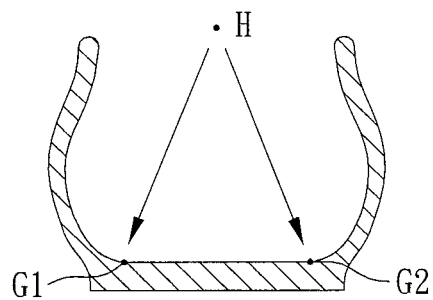
FIGS. 12 and 14 are sectional views of two alternative embodiments of the present invention.

Refer to FIG. 12 for the determination of tire lateral tilt. Said at least one wave-emitting source is located at H and is projecting said at least one detection wave in a line pattern on said internal surface, said line pattern is in parallel with Axis. Set up 2 points of reflection both G1 and G2 on said internal surface, both G1 and G2 are symmetrical about I. Further, set up two wave sensors on both sides of H that are in parallel with Axis and symmetrical about H, said two wave sensors receive respectively on said return wave being reflected off both G1 and G2 and output respective measurement signals. Said processing unit receives said measurement signals to compute the central angles of tire footprint on both the inner and outer sides respectively.

Figure 13:
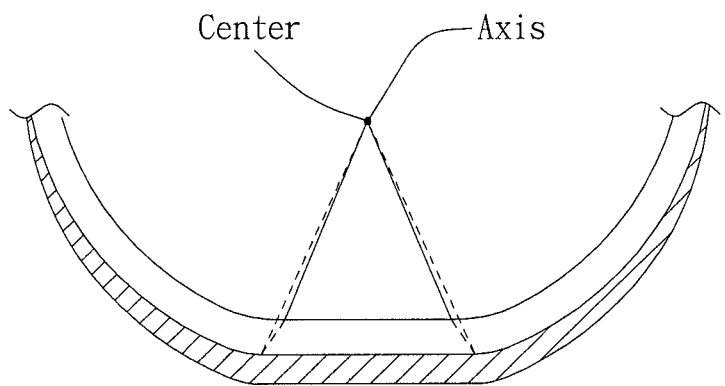
FIG. 13 is an axially sectional view of a tire having a non-zero lateral tilt.

As a tire tilts laterally, its central angle of tire footprint becomes larger on one side and smaller on the other side, FIG. 13 represents an axially sectional view of such a condition, both the solid and dotted triangles are formed by each central angle of tire footprint intersecting with said internal surface. Said processing unit further computes said lateral tilt with central angles of tire footprint on both inner and outer sides, or simply look it up in an established data bank of corresponding tests.

Figure 14:
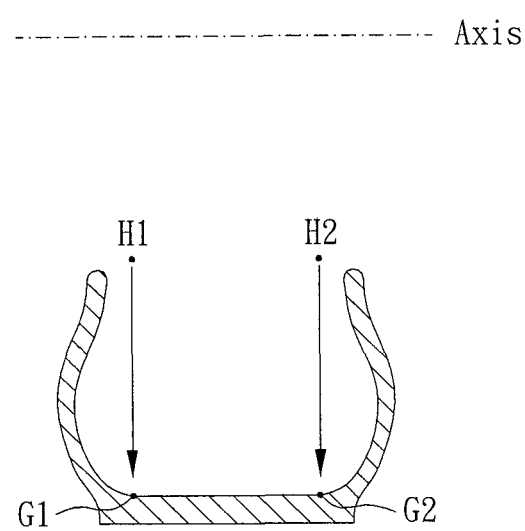

FIG. 14 shows an alternative embodiment for lateral tilt, two sets of wave-emitting source and wave sensor are located at H1 and H2 respectively with corresponding points of reflection being G1 and G2 respectively, both H1 and H2 are irrelevant. Said two sets of wave-emitting source and wave sensor function independently to project individual detection waves on corresponding points of reflection, receive said return wave by respective wave sensors respectively, and output measurement signals respectively. Said processing unit receives said measurement signals to compute the central angles of tire footprint on both the inner and outer sides respectively. Said processing unit further computes said lateral tilt or simply look it up in an established data bank of corresponding tests.

It is preferred for the present invention to incorporate a transceiver and a display unit, tire kinetic parameters are essential to not only drivers but also vehicle control systems such as ABS and ESP for next-level driving safety.

Although particular embodiments of the present invention are disclosed in detail for the purposes of illustration, various modifications and enhancements may be made without departing from the spirit and scope of the present invention. Accordingly, the invention is not to be limited except as by the appended claims.

What is claimed is:

1. A tire sensing system of kinetic parameters, including:
   at least one wave-emitting source configured to rotate with a tire, and emit at least one detection wave towards an internal surface of said tire;
   at least one wave sensor configured to rotate with said at least one wave-emitting source, and output a measurement signal according to a physical parameter of said at least one detection wave being reflected off said internal surface; and
   a processing unit configured to receive said measurement signal, record at least two instants in time during which said at least one detection wave sweeps across the footprint of said tire, and compute a kinetic parameter of said tire with said at least two instants.

2. The tire sensing system of kinetic parameters of claim 1, wherein said processing unit records three instants in time during which said at least one detection wave sweeps across said footprint of said tire, said processing unit computes a longitudinal kinetic parameter of said tire with said three instants, and said longitudinal kinetic parameter is one of frictional force, displacement and deformation.

3. The tire sensing system of kinetic parameters of claim 1, wherein said processing unit identifies at least one of a local extreme and a local time-rate extreme of change associated with said measurement signal, and records at least one of two instants associated with said local extreme and said local time-rate extreme of change.

4. The tire sensing system of kinetic parameters of claim 1, further including a reflective element, wherein said reflective element adheres to said internal surface.

5. The tire sensing system of kinetic parameters of claim 1, wherein said processing unit computes a central angle of tire footprint with said at least two instants and a cyclic period of said tire.

6. The tire sensing system of kinetic parameters of claim 1, wherein said at least two instants are recorded in one revolution of said tire.

7. The tire sensing system of kinetic parameters of claim 5, wherein said processing unit identifies at least one of a local extreme and a local time-rate extreme of change associated with said measurement signal, and records at least one of two instants associated with said local extreme and said local time-rate extreme of change.

8. The tire sensing system of kinetic parameters of claim 5, further including a reflective element, wherein said reflective element adheres to said internal surface.

9. The tire sensing system of kinetic parameters of claim 5, wherein two wave sensors are configured to rotate with said at least one wave-emitting source and output two measurement signals, said processing unit receives said two measurement signals and computes a lateral tilt of said tire.

10. The tire sensing system of kinetic parameters of claim 9, wherein said processing unit identifies at least one of a local extreme and a local time-rate extreme of change associated with said two measurement signals, and records at least one of two instants associated with said local extreme and said local time-rate extreme of change.

11. The tire sensing system of kinetic parameters of claim 9, further including a reflective element, wherein said reflective element adheres to said internal surface.

* * * * *